Patented May 25, 1937

2,081,541

UNITED STATES PATENT OFFICE 2,081,541

PROCESS FOR SOLIDIFYING SOILS

Hugo Joosten, Berlin-Schoeneberg, Germany

No Drawing. Application August 11, 1936, Serial No. 95,490. In Germany March 19, 1935

12 Claims. (Cl. 61—36)

This invention relates to a process for solidifying and tightening or strengthening sandy masses, loose soils, building structures and parts thereof by a solution of silicic acid pressed into said objects. The methods known for this purpose consist in pressing first a solution of water-glass into the masses to be solidified and thereupon a solution of a suited acid or salt, for instance of calcium chloride, or in pressing in both chemicals simultaneously or in mixture. Whereas with the first named method both chemicals do not meet but within the mass to be solidified where the solidification occurs momentarily when the acid silicic gel is set free or produced, the other ones present the very severe disadvantage that gelation may occur already before the chemicals penetrate into the mass to be solidified and that therefore the solidification does not take place at all or at least not in the manner and the extent as desired.

It has already been proposed, in order to avoid this draw-back, to choose such a concentration of the solution containing the alkali silicate and the acid or the precipitating salt, respectively, as will cause the gelation or coagulation not to begin immediately after the mixing of both components but only after some time, and it has been tried to choose such a relation for the mixture as will fix the time for the beginning of the coagulation. But on the one hand this method is not to be depended upon and on the other hand it is necessary in using this method to perform the mixing of the chemicals only at the place of utilization, immediately before pressing it into the mass to be solidified. Moreover, when using diluted solutions as are required to avoid immediate or too quick a flocculation, a gel very rich in water is formed, unsuitable for permanent solidification of the mass and for obtaining high strengths thereof.

It now has been found that the aforesaid drawbacks may be avoided but nevertheless the solidification of the masses may be attained by pressing in a single solution of chemicals when a concentrated solution containing the silicic acid sol in an unstable or labile state is applied. For this purpose a composition is specially suited which is formed from a concentrated solution of an alkali silicate by first adding a suitable precipitating metal salt solution, particularly such of soluble zinc salts, e. g., zinc chloride or sulfate, and then bringing the precipitate thus obtained again to solution by adding ammonia or substances containing ammonia, or by previously admixing said ammonia and thereby preventing the formation of the precipitate from the first. Such a labile solution of silicic acid is permanently keeping when stocked or stored. On the contrary coagulation or flocculation sets in when the ammonia of the solution finds an opportunity to volatilize or to escape, as for instance already when the labile or instable solution is spread in a very fine dispersion on the surface of the single grains of the mass to be solidified. Such a coagulation may also be caused, it is true, by the mere dilution of the labile solution, but this would lead to the formation of the undesired highly water containing gel. In opposition to the behaviour of the regular known solutions with which the precipitation sets in of itself some time after the mixture of both chemicals is produced, such automatic precipitation only by the action of time must not be feared for if the said unstable or labile solutions are employed. Therefore in this case no premature coagulation occurs neither in the drums nor in the pumps nor in the conduit.

A specially quick and complete precipitation of the gel from the instable or labile solution takes place if the ammonia is expelled totally or partially by introducing other gases or vapours, such as particularly air. For this purpose, according to the present invention, air or any other gas or vapour are pressed into the masses to be solidified or rendered dense during or after the pressing in of the labile silicic acid solution. Coagulation then immediately begins within the treated mass. Thereby the undesired washing away by steaming water of the silicic acid solution pressed in is prevented in a very effective manner.

When the unstable silicic acid solution according to the present invention is pressed into the masses or the like to be solidified or tightened, the solution spreads over the large surface of the grains of the mass or the like or penetrates into the finest pores thereof and covers said small particles with a thin coating or film. In order to hasten the precipitation of the gel from it, according to the invention during or after the pressing in of the unstable or labile sol into the mass to be solidified, gases or vapours, for instance such as are indifferent like air, are pressed in. Thereby not only a yet finer division of the unstable sol within the masses is caused but before all also the more or less complete expulsion of the volatile components on the presence of which the existence of the instable sol depends. It has already been suggested in the known methods where the solidification is effected by pressing in different chemicals the one after the other or mixed, to obtain a better distribution of the materials in the soil and, if possible, a farther reaching consolidation by pressing in any inert gas like air. In the present case, however, the pressing in of the air or the like additionally has yet the special precipitating action. Moreover, the gel thus coagulated is distinguished by its high stability. Thus not only a good and far going dispersion of the gel in the mass to be solidified is obtained but also an extraordinarily quick and durable and therefore safe consolidation.

It is of advantage for obtaining of a good consolidation and tightening of the masses to be treated, if the used unstable silicic acid solution contains as little water as possible, since then also a gel poor in water is obtained. In other directions the composition of the unstable silicic acid solution to be used according to the present invention may vary, for instance a waterglass solution of the concentration usual for processes of chemical solidification, i. e. of about 37° to 40° Bé., may be employed, and this solution may be brought to the unstable state by adding the equivalent amount of a zinc chloride solution and introducing ammonia gas. Thus for instance, for the manufacture of 100 kgs. of an unstable waterglass solution 85 kgs. of a waterglass solution of 38° Bé. are treated with 1,70 kgs. of anhydrous zinc chloride, 7,93 kgs. of water, 1,13 kgs. of sodium hydrate and with 4,24 kgs. of ammonia liquor of 25% content. Instead of the zinc chloride other soluble zinc salts, e. g. zinc sulphate may be used.

In working according to the new process of consolidation, one can simply proceed for instance by pressing the unstable or labile solution of the silicic acid or silicate into the mass to be solidified, such as a sandy mass, soil layers or sandy rock layers, building structures, parts thereof, and the like, and then immediately pressing in the air accelerating coagulation and favouring the consolidation. If desired, the pressing in of the labile solution of the sol and of the air may, however, also be performed simultaneously, either by means of separate conduits or through one and the same conduit. Particularly in the latter case a spray or drizzle formed by the sol and the air or the like is introduced into the mass to be solidified. Thus it is possible to solidify a mass of loose sand within short time to such a degree that a solid body having a compressive strength of 13 kgs./cms.$^2$ and more is obtained. The effect of the introducing of air or the like increases with the pressure applied. When air was pressed in with about 6 atms. nearly the same degree of consolidation was reached within 15 minutes after pressing as was obtained after 48 hours' storage with 1 atmosphere.

If desired, after introducing the unstable solution of silicic acid or the like into the mass to be solidified or to be consolidated, yet a concentrated solution of a salt of such kind may be introduced as is capable to produce coagulation in waterglass solutions, for instance a concentrated solution of calcium chloride. The concentrated salt solution may be introduced either before or after the air or any other gas is pressed in or simultaneously therewith. Of course, the air or the like may also in this case be pressed in jointly with the pressing of the unstable silicic acid or waterglass solution, as described before. By introducing yet a concentrated salt solution an increased consolidation results.

The introduction of a second chemical may be made also for the purpose to bind any free ammonia eventually left in the mass in spite of the air, gas, vapour or the like pressed in, and thus to make complete the separation of the silicic acid gel from the labile solution and to accelerate this complete separation. As has been proved, the masses treated in this way have a still higher compressive strength than those treated only with the labile waterglass solution and with the pressing in of air or the like. Thus objects are obtained with a compressive strength of 20 kgs./cms.$^2$ and more. This favourable result may already be obtained also, if as a second chemical a solution of calcium chloride or the like is pressed in as stated above. If compared with the known processes employing in ordinary waterglass solution as the first chemical utilized, the just described procedure according to the present invention is advantageous in so far as by the use of the labile silicic acid or waterglass solution and the pressing in of air or the like a partial consolidation takes place before the concentrated salt solution forming the second chemical can be introduced. Thereby it is prevented that any water current which may exist within the soil layer or the like to be solidified may wash away the solution of silicic acid or waterglass before the consolidation by means of the concentrated salt solution introduced later on can begin.

An absolutely complete binding of any ammonia which should yet be left free in the introduced labile silicic acid solution may be attained by forcing in substances combining with ammonia, such as particularly acids or acid salts. These substances may be introduced either for themselves or jointly with the concentrated salt solution which may also be introduced into the mass, if desired, supposed that they will be compatible with the latter. For instance hydrochloric acid can be used though, of course, practically the application of free acids is rather unconvenient. As acid salts in the first place such as sodium bicarbonate or bisulfate may be used. But also other salts than acid ones may be employed, e. g. such as can combine with ammonia to form double salts, as for instance copper salts, iron salts and so on, being compatible with calcium chloride in opposition to sodium bicarbonate.

Also gases capable to bind ammonia can be pressed in instead of liquids, and especially carbonic acid gas. When such a gas capable of binding ammonia is used, it may be employed instead of or jointly with the gas for expelling the ammonia. Consequently, after having introduced the labile or unstable silicic acid or waterglass solution into the mass to be solidified, a mixture of air and carbon dioxide may be pressed in, whereby on the one side the ammonia is expelled out of the unstable silicic acid solution and on the other side as much as is left of it gets combined with the simultaneously present carbonic acid gas.

Having now particularly described and ascertained the nature of my said invention, I declare that what I claim is:—

1. A process of solidifying and tightening sandy masses, loose soils, building structures and parts of such structures which comprises introducing into the mass to be treated a labile solution of a material containing silicic acid and ammonia, and a gas for expelling the ammonia from said labile solution.

2. A process of solidifying and tightening sandy masses, loose soils, building structures and parts of such structures as claimed in claim 1, whereby the gas for expelling the ammonia is introduced into the mass to be treated simultaneously with the introduction of the material containing silicic acid and ammonia.

3. A process of solidifying and tightening sandy masses, loose soils, building structures and parts of such structures as claimed in claim 1, whereby the gas for expelling the ammonia is introduced into the mass to be treated after the introduction of the material containing silicic acid and ammonia.

4. A process of solidifying and tightening sandy masses, loose soils, building structures and parts of such structures which comprises introducing into the mass to be treated a labile solution formed by treating dissolved waterglass with precipitating salts and ammonia, and a gas for expelling the ammonia from said labile solution.

5. A process of solidifying and tightening sandy masses, loose soils, building structures and parts of such structures which comprises introducing into the mass to be treated a labile solution formed by treating dissolved waterglass with soluble zinc salts and ammonia, and a gas for expelling the ammonia from said labile solution.

6. A process of solidifying and tightening sandy masses, loose soils, building structures and parts of such structures which comprises introducing into the mass to be treated a labile solution of a material containing silicic acid and ammonia, and a gas for expelling the ammonia from said labile solution and introducing a concentrated salt solution suitable for precipitation of silica from water glass.

7. A process of solidifying and tightening sandy masses, loose soils, building structures and parts of such structures which comprises introducing into the mass to be treated a labile solution of a material containing silicic acid and ammonia, and a gas for expelling the ammonia from said labile solution, a highly concentrated solution of calcium chloride hereafter being introduced into the mass to be treated.

8. A process of solidifying and tightening sandy masses, loose soils, building structures and parts of such structures which comprises introducing into the mass to be treated a labile solution of a material containing silicic acid and ammonia, a gas for expelling the ammonia from said labile solution, and a substance capable of binding ammonia.

9. A process of solidifying and tightening sandy masses, loose soils, building structures and parts of such structures which comprises introducing into the mass to be treated a labile solution of a material containing silicic acid and ammonia, a gas for expelling the ammonia from said labile solution, and the solution of an acid containing substance capable of binding ammonia.

10. A process of solidifying and tightening sandy masses, loose soils, building structures and parts of such structures which comprises introducing into the mass to be treated a labile solution of a material containing silicic acid and ammonia, and carbon dioxide.

11. A process of solidifying and tightening sandy masses, loose soils, building structures and parts of such structures which comprises introducing into the mass to be treated a labile solution of a material containing silicic acid and ammonia, and then a mixture of air and carbon dioxide.

12. A process of solidifying and tightening sandy masses, loose soils, building structures and parts of such structures which comprises introducing into the mass to be treated a labile solution of a material containing silicic acid and ammonia, and a gas for expelling the ammonia from said labile solution, and introducing simultaneously a concentrated salt solution for precipitation of silica from water glass and a substance adapted to bind ammonia.

HUGO JOOSTEN.